A. L. SNOW.
SPRING.
APPLICATION FILED AUG. 6, 1908.
997,423.
Patented July 11, 1911.
3 SHEETS—SHEET 1.
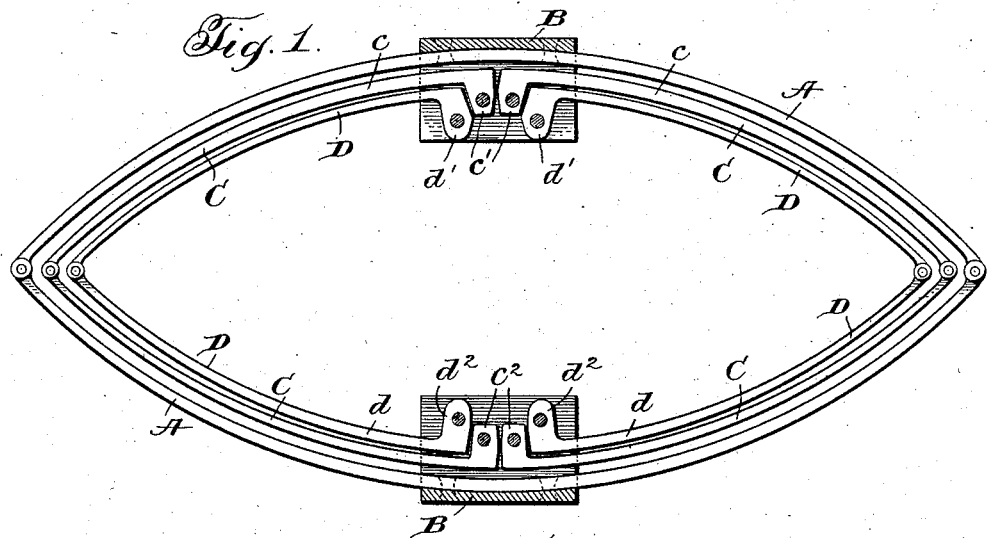
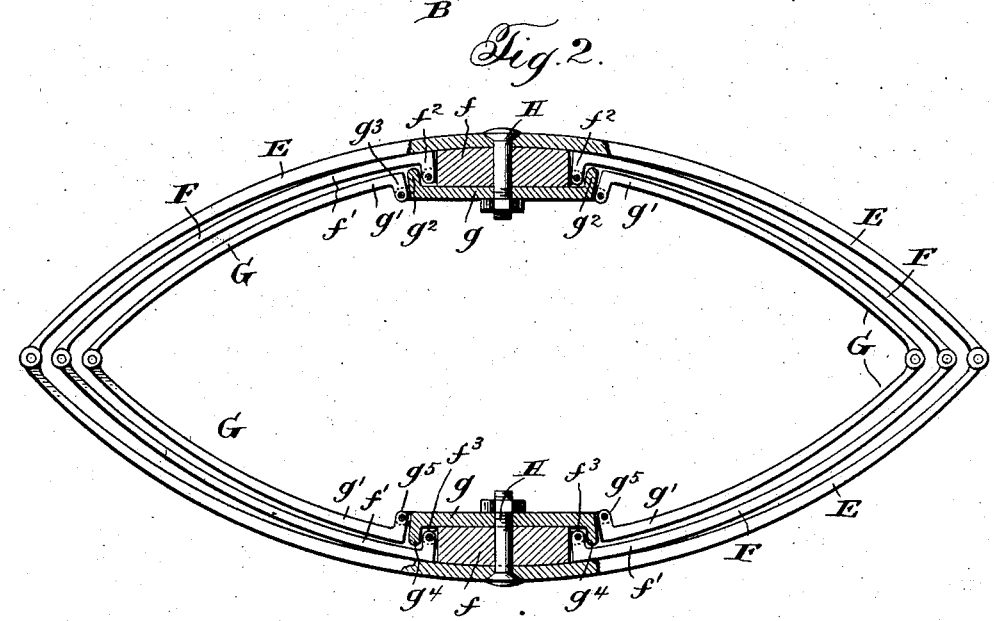
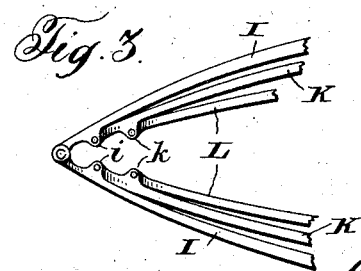
Witnesses:
Jas. E. Hutchinson
Thos. C. Heath
Inventor:
A. L. Snow,
By McM... Attorneys

A. L. SNOW.
SPRING.
APPLICATION FILED AUG. 6, 1908.

997,423.

Patented July 11, 1911.

3 SHEETS—SHEET 2.

A. L. SNOW.
SPRING.
APPLICATION FILED AUG. 6, 1908.

997,423.

Patented July 11, 1911.

3 SHEETS—SHEET 3.

Witnesses:
Jas. E. Hutchinson
Thos. P. Heath

Inventor:
A. L. Snow,
By Thos. W. Milans Attorneys

UNITED STATES PATENT OFFICE.

ARTHUR LELAND SNOW, OF KINGFISHER, OKLAHOMA, ASSIGNOR TO GRACE C. SNOW, OF COMFORT, TEXAS.

SPRING.

997,423.  Specification of Letters Patent.  Patented July 11, 1911.

Application filed August 6, 1908. Serial No. 447,344.

*To all whom it may concern:*

Be it known that I, ARTHUR L. SNOW, citizen of the United States, residing at Kingfisher, in the county of Kingfisher and State of Oklahoma, have invented certain new and useful Improvements in Springs, of which the following is a specification, reference being had therein to the accompanying drawing.

This invention relates to an improvement in springs designed particularly for use upon carriages, wagons, and motor or other cars and more particularly to the type of springs known as elliptic or semi-elliptic.

The invention relates more particularly to a spring of this type which is of such a construction that it will automatically adapt itself to the load which is to be supported, whether the same be heavy or light, and the primary object of the present invention is the provision of a spring of this particular character of a compact form which will efficiently perform the functions for which it is designed.

A further object of the invention is the provision of a spring of this character of a simple construction, the several parts of which are so fashioned and assembled that all vibration thereof will be prevented regardless of the degree of compression to which the spring is subjected.

A further object of the invention is the provision of a spring of this type which will prevent excessive vibration of the vehicle upon which it is used in either direction.

Other objects of the invention will be apparent from the detailed description hereinafter when read in connection with the accompanying drawings forming a part hereof, wherein several preferred embodiments of the invention are illustrated.

While a number of preferred embodiments of the invention are illustrated in the accompanying drawings it will, however, be understood that the invention is not necessarily limited to the constructions shown, as the springs may be constructed in many different ways without departing from the spirit of the invention as defined in the appended claims.

Figure 4:
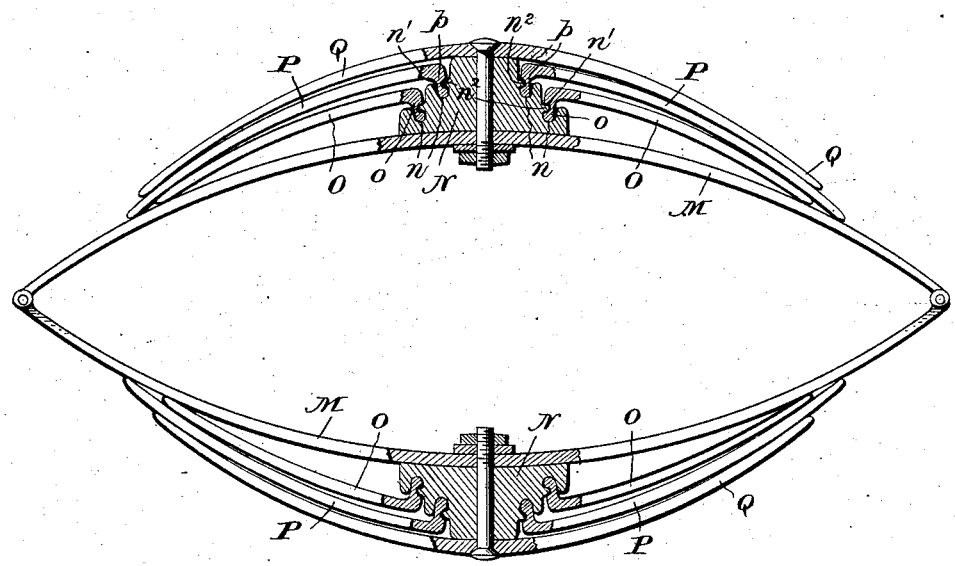
Figure 5:
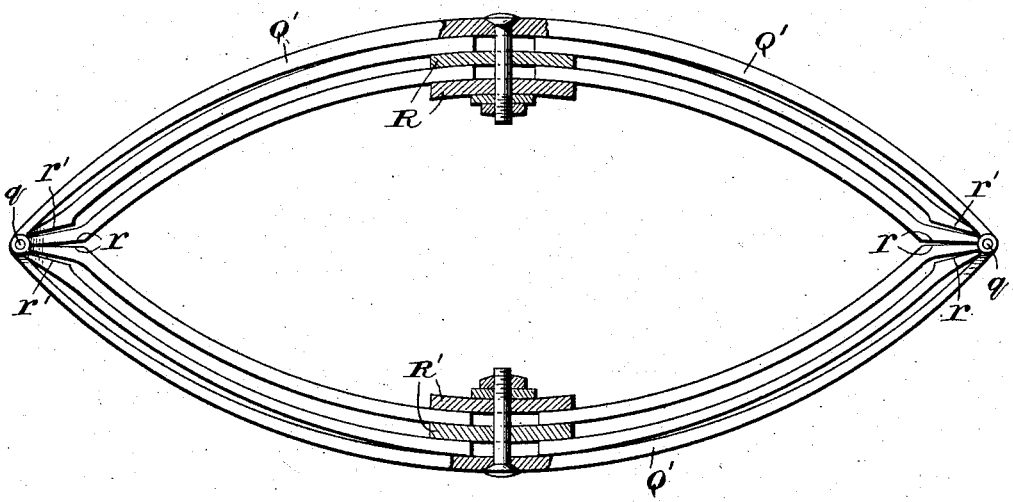
Figure 6:
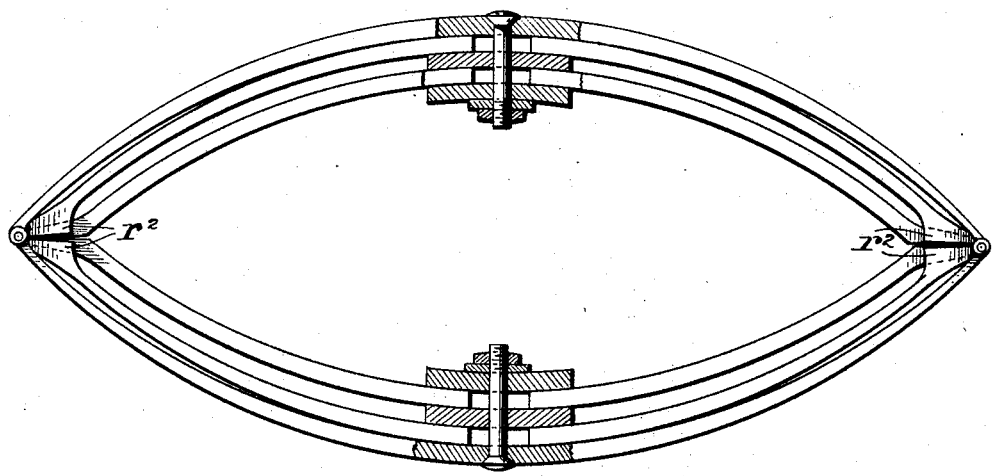
Figure 7:
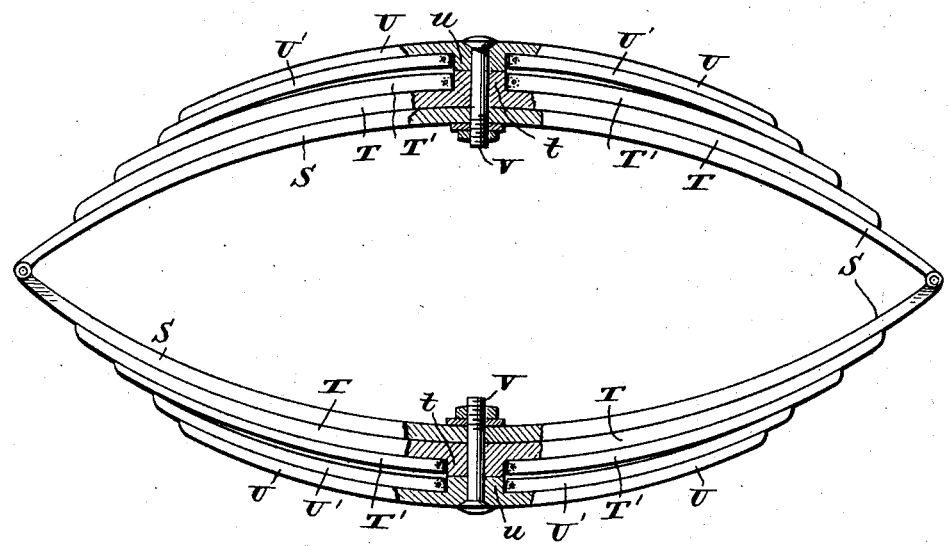

In the drawings, wherein like numerals of reference refer to similar parts in the several views, Figure 1 is a side elevation of an elliptic spring constructed in accordance with my invention, with parts broken away, Fig. 2 is a side elevation, parts being shown in section, of a modified form of the invention, Fig. 3 is a side elevation of another modified form of the invention, Fig. 4 is a side elevation showing another modification of the invention, Fig. 5 is a side elevation showing another modification of the invention, Fig. 6 is a side elevation, parts being shown in section, showing another modified form of the invention, and Fig. 7 is a side elevation, parts being shown in section, showing another modified form of the invention.

In the form of the invention disclosed in Fig. 1, the spring comprises an elliptic spring formed of two oppositely arranged continuous semi-elliptic springs A A, the ends of which are connected by hinged joints of the usual construction, and rigidly secured in any suitable manner over the intermediate portions of the semi-elliptic springs A A are oppositely disposed U-shaped saddles B B. Lying within the elliptic spring thus formed are two supplemental elliptic springs, one of which is formed of two oppositely disposed semi-elliptic portions C C and the other of which is formed of two oppositely disposed semi-elliptic portions D D. The semi-elliptic portions C C are each formed in two sections $c$ $c$, the outer ends of which are connected by hinged joints of any suitable construction and the inner ends of which are adapted to extend between the side walls of the oppositely disposed U-shaped saddles B B and to be pivotally connected thereto in any suitable manner. In the preferred form of the invention, the inner ends of the upper sections $c$ $c$ are provided with integral pintles which project from the sides thereof and loosely engage apertures formed in the side walls of the saddles. The inner ends of the two upper sections $c$ $c$ are provided with downwardly extending portions $c'$ $c'$, the outer faces of which are arranged in close proximity to each other, while the inner ends of the lower sections $c$ $c$ are provided with similar upwardly extending portions $c^2$ $c^2$. The adjacent faces of both the portions $c'$ $c'$ and $c^2$ $c^2$ are each provided with two angularly disposed surfaces which are so arranged that when the spring which is formed of the portions C C is moved a predetermined distance in either direction, the outer faces of the portions $c'$ $c'$ and $c^2$ $c^2$ of both the upper and lower sections $c$ $c$ will be caused to abut so that said sections will become in effect rigid semi-elliptic members and the supplemental spring formed thereof will then come into action to assist the primary spring formed of the semi-elliptic springs A A in supporting the load. The semi-elliptic portions D D are each formed in two sections $d$ $d$ the outer ends of which are pivotally connected by suitable hinge joints and the inner ends of which project between the side walls of the oppositely disposed U-shaped saddles B B and are pivotally connected thereto in the same manner as heretofore described with reference to the sections $c$ $c$. The inner ends of the two upper sections $d$ $d$ are provided with angularly disposed downwardly extending portions $d'$ $d'$, which when the parts are assembled are adapted to lie immediately alongside of the downwardly extending portions $c'$ $c'$ of the sections $c$ $c$ heretofore described, the construction being such that after the primary and first secondary springs have been compressed to a predetermined extent, the inner surfaces of the downwardly extending portions $c'$ $c'$ of the sections $c$ $c$ will be caused to abut the outer surfaces of the downwardly extending portions $d'$ $d'$ of the sections $d$ $d$, thereby locking the sections $d$ $d$ so that they will assist in bearing the load on the spring. The inner ends of the lower sections $d$ $d$ are provided with angularly disposed upwardly extending portions $d^2$ $d^2$, which are adapted to lie alongside of the inner surfaces of the upwardly extending portions $c^2$ $c^2$ of the sections $c$ $c$ and are adapted to abut thereagainst in the same manner as heretofore described with reference to the portions $d'$ $d'$, when the spring has been placed under a predetermined amount of depression. With the construction thus described, it will be apparent that under light loads, the semi-elliptic members A A only will be placed under compression and the supplemental springs formed of the semi-elliptic portions B B and C C will not be compressed but the sections thereof will merely move idly on their pivots. If, however, the load is increased beyond a predetermined point, it is obvious that the supplemental springs will be brought into action successively. As the supplemental spring formed of the semi-elliptic portions B B is brought into action after a predetermined movement in either direction, it is obvious that this spring not only serves to assist the primary spring in carrying any excessive load to which it may be subjected but also checks the rebound of said primary spring so that undue vibration of the vehicle is prevented. While only two supplemental springs are illustrated, it is obvious that as many as desired may be utilized.

It will be noted that in the arrangement of spring just described, the supplemental springs are nested, so that the entire spring when assembled takes up but little more space than the ordinary elliptic spring now in use. This nested arrangement will be followed regardless of the number of supplemental springs which are employed.

In the form of the invention disclosed in Fig. 2, the spring comprises a primary elliptic spring formed of two oppositely arranged continuous semi-elliptic springs E E, the ends of which are connected by hinged joints of the usual construction, and positioned within the spring thus formed are two secondary springs F and G of the elliptic type. The secondary spring F comprises upper and lower sections of semi-elliptic form, each of which comprises a central member $f$, to the ends of which are pivoted end members $f'$, the outer ends of said end members being pivotally connected to each other by suitable hinge joints. The central members $f$ of the upper and lower sections of the supplemental spring F are of considerable thickness and are adapted to be rigidly secured by suitable bolts H to the inner sides of the semi-elliptic springs E E intermediate the ends thereof. The inner ends of the end members $f'$ of the upper section of the secondary spring F terminate in downwardly extending portions $f^2$, the lower ends of which are pivotally secured in any suitable manner between ears extending from the ends of the upper central member $f$, while the inner ends of the end members of the lower section of the supplemental spring F terminate in similarly formed upwardly extending portions $f^3$, the upper ends of which are pivotally supported between ears extending from the lower central member $f$. Under normal conditions of the spring there is always a slight space between the adjacent faces of the end members of the upper and lower sections of the secondary and the central members thereof, but after a predetermined amount of compression has been placed on the spring the adjacent faces of the end and central members of the sections of the supplemental spring are caused to abut, thereby bringing the supplemental spring into action. The supplemental spring G, which is secured within the supplemental spring F comprises upper and lower sections of semi-elliptic form, each of which comprises a central member $g$ to the ends of which are pivoted end members $g'$ the outer ends of said end members being pivotally connected to each other by suitable hinge joints. The central member $g$ of the upper section of the supplemental spring G comprises a relatively thin flat plate which is adapted to be clamped to the under side of the upper central member $f$ heretofore described by means of the bolt H and which is provided at its ends with upwardly extending portions $g^2$ which are adapted when the spring is assembled to lie alongside of the downwardly extending portions of the end members $f'$. The inner ends of the end members $g'$ of the upper section of the supplemental spring G terminate in downwardly extending portions $g^3$, the lower ends of which are pivotally secured in any suitable manner between ears extending from the upwardly extending portions $g^2$ of the central member $g$, the construction being such that under normal conditions there will be a slight gap between the adjacent faces of the downwardly extending portions $g^3$ of the end members $g'$ and the upwardly extending portions $g^2$ of the central member $g$, but that after the primary spring and the secondary spring F have been placed under a predetermined degree of compression such faces will be caused to abut and the central and end members locked together to form a substantially rigid elliptic spring. The central member $g$ of the lower section of the supplemental spring G comprises a relatively thin flat plate which is adapted to be clamped to the top of the lower central member $f$ heretofore described by means of the bolt H and which is provided at its ends with downwardly extending portions $g^4$ which are adapted when the springs are assembled to lie alongside of the upwardly extending portions of the end members $f'$ of the lower section of the supplemental spring F. The inner ends of the end members $g'$ of the lower section of the supplemental spring G terminate in upwardly extending portions $g^5$, the upper ends of which are pivotally secured between ears extending from the downwardly extending portion $g^4$ of the central member, the adjacent faces of the upwardly extending portions of the end members and the downwardly extending portions of the central member being adapted to abut after the spring has been placed under a predetermined degree of compression. While only two supplemental springs have been shown, it is obvious that as many as desired may be used.

In the form of the invention illustrated in Fig. 3, the spring comprises a primary elliptic spring formed of two oppositely arranged continuous semi-elliptic springs I I, within which spring are positioned secondary springs K and L. The supplemental or secondary springs K and L are similar in construction to the secondary springs F and G heretofore described except that the ends of the upper and lower sections of the secondary spring K are pivotally secured between ears $i$ which extend from the inner surfaces of the semi-elliptic springs I I, while the ends of the upper and lower sections of the supplemental spring L are pivotally secured between ears $k$ which extend from the inner surfaces of the upper and lower sections of the supplemental spring K.

In the form of the invention illustrated in Fig. 4, the spring comprises a primary elliptic spring formed of two oppositely disposed semi-elliptic springs M M, the ends of which are connected by the usual hinge joints. Rigidly secured to the upper surface of the top section of the primary spring in any suitable manner is a block N, the sides of which are provided with a plurality of stepped recesses $n$. O O designate a pair of supplemental spring members, the outer ends of which are designed to rest upon the upper surface of the top section of the primary spring and the inner ends of which are provided with downwardly turned portions $o$ which are adapted to fit into the lowermost recesses $n$ in the sides of the block N. Positioned above the supplemental spring members O O are two supplemental spring members P P, the outer ends of which are designed to rest upon the upper surface of the top section of the primary spring and the inner ends of which are provided with downwardly extending portions $p\ p$ which are adapted to fit into the uppermost recesses $n$ in the sides of the block N. To prevent lateral movement of the supplemental spring members O O and P P in the recesses $n$ in the sides of the block N, the outer faces of the downwardly extending portions $o\ o$ and $p\ p$ of the springs are provided with recesses $n'$ therein, into which project lugs $n^2$ which extend from the adjacent portions of the block N. Q designates a retaining spring which is rigidly secured to the top of the block N and serves to hold the supplemental springs in proper position. Under normal conditions the construction of the parts is such that there are slight spaces between the adjacent faces of the downwardly extending portions $o\ o$ and $p\ p$ of the supplemental springs O O and P P and the block N, the spaces between the downwardly extending portions $p\ p$ of the top springs P P and the block N being slightly greater than the spaces between the downwardly extending portions $o\ o$ of the bottom spring O O and the block N. With this construction under ordinary loads the primary spring only will be brought into action but after the same has been compressed beyond a predetermined extent, the outer faces of the downwardly extending portions $o\ o$ of the supplemental spring members O O will be caused to abut the adjacent portions of the block N, thereby bringing said springs into action, and if the compression is still further increased, the supplemental springs P P will be brought into action in a similar manner. The bottom surface of the lower section of the primary spring is provided with secondary springs similar in construction to those heretofore described in connection with the top section and which need not therefore be described in detail.

In the form of the invention illustrated in Fig. 5, the spring comprises a primary spring formed of two semi-elliptic members Q' Q', the ends of which are connected by the usual hinge pintles $q$ $q$. Pivotally supported upon each of the hinge pintles $q$ and lying within the elliptic spring formed by the members Q' Q' are two pairs of supplemental spring members, free ends of the upper pairs of said spring members being clamped between spring plates R which are bolted to the upper semi-elliptic springs Q' Q' so as to be capable of longitudinal movement therebetween, and the free ends of the lower pairs of said supplemental spring members being clamped between similar spring plates R' which are bolted to the lower semi-elliptic spring Q'. The adjacent ends of the innermost supplemental spring members are provided with shoulders $r$, which under normal conditions of the spring are slightly separated but which are designed after the primary spring has been placed under a predetermined degree of compression to abut so that the innermost supplemental springs will be brought into action. The outer ends of the intermediate supplemental springs are provided with shoulders $r'$ which are adapted after the innermost supplemental springs have been brought into action and the spring is subjected to further compression to abut against the outer surfaces of the innermost supplemental springs, thereby bringing said intermediate supplemental springs into action to assist the primary and innermost supplemental springs in supporting the load.

In Fig. 6, the spring illustrated is similar in construction to that illustrated in Fig. 5 except that the outer ends of the intermediate supplemental springs are provided with side flanges $r^2$ which overlie the outer ends of the innermost supplemental spring members, the adjacent edges of said side flanges being adapted to abut after the primary and innermost supplemental springs have been brought into action, to bring into action the intermediate supplemental springs.

In Fig. 7 the spring comprises a primary spring formed of two semi-elliptic members S S, which are pivotally connected at the ends thereof by the usual hinge joint. Resting upon the upper surface of the upper semi-elliptic spring S is a spring T from the upper central portion of which extends a lug or block $t$ to the sides of which are pivotally connected in any suitable manner supplemental spring members T', which normally rest idly upon the upper surface of the spring T, the construction being such, however, that after the primary spring has been compressed to a predetermined extent, the ends of the supplemental spring members T' will abut the adjacent portions of the block $t$, thereby bringing the supplemental spring members into action to assist the primary spring in supporting the load. Positioned above the spring T and the supplemental springs carried thereby is a spring U from the central portion of which depends a lug or block $u$ to the sides of which are pivotally connected in any suitable manner supplemental spring members U', which normally rest idly upon the upper surfaces of the supplemental spring members T', the construction being such, however, that after the primary spring and supplemental springs T' have been brought into action and the spring is subjected to further compression the ends of the supplemental spring members U' will abut the adjacent portions of the block $u$, thereby bringing such spring members into action also. The supplemental springs are secured in position upon the upper surface of the top semi-elliptic spring S by means of a bolt V which passes through the spring S, the springs T and U, and the block $t$ and $u$ carried thereby. Supplemental springs are also secured to the lower semi-elliptic member S but as they are similar in construction to those heretofore described in connection with the upper semi-elliptic member, it is unnecessary to describe them in detail.

While the invention has been described particularly as applied to elliptic springs, it will be obvious that it may likewise be applied to semi-elliptic springs, quarter springs, and torsional springs.

I claim:

1. In a device of the character described, a primary spring, and a secondary spring associated therewith, comprising a plurality of pivoted sections, and means for locking said sections against movement on their pivots after a predetermined movement of the primary spring in either direction.

2. In a device of the character described, a primary spring, a secondary spring associated therewith, comprising pivotally connected sections, said sections being provided with shoulders adapted to abut after a predetermined movement of the primary spring in either direction.

3. In a device of the character described, a primary semi-elliptic spring, a supporting member carried thereby, a pair of supplemental spring members having their inner ends pivoted to said supporting member, and means for locking said supplemental spring members against movement on their pivots after a predetermined movement of the primary spring in either direction.

4. In a device of the character described, a primary semi-elliptic spring, a saddle plate carried thereby, a pair of supplemental spring members having their inner ends pivoted to said saddle plate and provided on their adjacent faces with locking shoulders which are adapted to abut after a predetermined movement of the primary spring in either direction.

5. In a device of the character described, a primary semi-elliptic spring, a plate carried thereby, a pair of supplemental spring members provided with downwardly extending portions at the ends thereof which are pivotally connected to said plate, the adjacent faces of said downwardly extending portions being adapted to abut after a predetermined movement of the primary spring, and a second pair of supplemental spring members provided at the inner ends thereof with downwardly extending portions pivotally connected to said plate and adapted to abut the inner-surfaces of the downwardly extending portions of said first mentioned supplemental spring members after a predetermined movement of the primary spring.

6. A device of the character described comprising a primary leaf spring, and a plurality of superposed secondary leaf springs carried thereby, all of said secondary springs being normally idle and adapted to be brought successively into action only upon a predetermined movement of the primary spring in one direction, and one of said secondary springs being adapted to be brought into action upon a predetermined movement of the primary spring in either direction.

7. A device of the character described comprising a primary semi-elliptic spring and a plurality of secondary springs carried thereby each formed of pivoted sections the sections of all of said supplemental springs being adapted to be successively locked against movement upon a predetermined movement of the primary spring in one direction, and the sections of one of said supplemental springs being adapted to be locked against movement upon a predetermined movement of the primary springs in either direction.

8. In a device of the character described, a primary semi-elliptic spring, a member carried by the central portion of said primary spring, and a plurality of secondary spring members having their inner ends pivotally connected to said member on opposite sides thereof in stepped relation, said secondary spring members being adapted to be brought into action successively upon a predetermined movement of the primary spring.

9. A device of the character described, comprising a leaf spring, a supplemental leaf spring pivotally connected thereto, and means for locking said supplemental leaf spring against movement on its pivot after a predetermined extent of movement in either direction.

In testimony whereof I affix my signature in presence of two witnesses.

ARTHUR LELAND SNOW.

Witnesses:
Thos. R. Heath,
K. P. Howard.

---

Copies of this patent may be obtained for five cents each, by addressing the "Commissioner of Patents, Washington, D. C."